Nov. 1, 1932.   G. M. THOMSON   1,885,785

APPARATUS FOR MAKING FOAM

Filed Sept. 19, 1927

GEORGE MILLER THOMSON.
INVENTOR.

By Marks & Clerk

ATTORNEYS.

Patented Nov. 1, 1932

1,885,785

UNITED STATES PATENT OFFICE

GEORGE MILLER THOMSON, OF CALEDONIA, ONTARIO, CANADA, ASSIGNOR TO CANADA GYPSUM AND ALABASTINE LIMITED, OF PARIS, ONTARIO, CANADA

APPARATUS FOR MAKING FOAM

Application filed September 19, 1927. Serial No. 220,615.

This invention relates to an apparatus for making foam.

The object of the invention is to provide a foam-making apparatus which may be readily controlled in continuous or intermittent operation and which has collapsible means for admitting air to a constant supply of water containing a foam-producing agent, such that when the air supply is cut off, the water does not interfere with the air distributing means.

The apparatus will be best understood by reference to the accompanying drawing in which one embodiment of the invention is illustrated diagrammatically.

Figure 1:
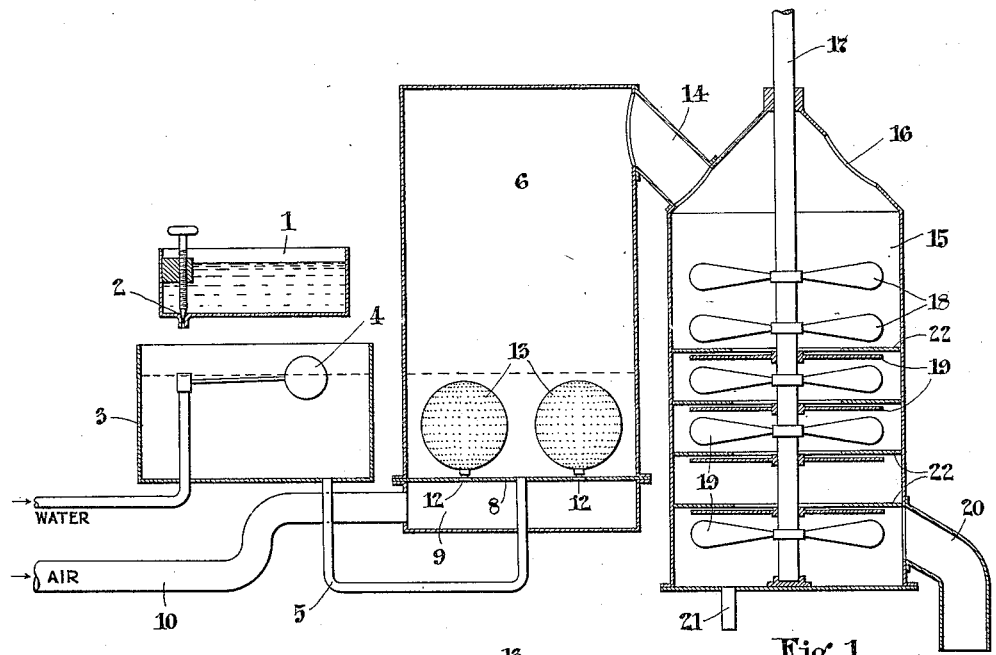
Figure 1 is a sectional elevation view of the apparatus.
Figure 2:
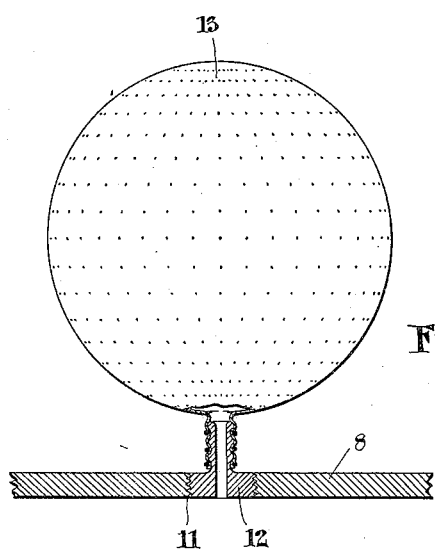
Figure 2 is a detail view.

In the drawing 1 represents a container for a concentrated solution of a suitable foam producing agent, such as saponin, having a needle valve 2 to regulate the flow of the solution to a water tank 3. The flow of water to the tank 3 from the source of supply is regulated by means of the float 4. The vessel 6 has a horizontal partition 8 forming an air chamber 9 in its lower end and the air chamber 9 is connected to a constant pressure blower, not shown, by means of the pipe 10. Water is admitted to the vessel above the partition 8 by means of the pipe 5 connected to the water tank 3 and is maintained therein at a constant level.

The partition 8 is provided with any desired number of holes 11 in which nipples 12 are secured, and to each nipple is fastened a collapsible rubber bag 13 which is uniformly punctured for a purpose to be later described. An ordinary soccer bootball bladder provides a very suitable form of collapsible rubber bag and it may be fastened to the partition in any desired way.

A discharge spout 14 connects the vessel 6 with a cylindrical agitating chamber 15 having vent 16 at the top thereof. A rotatable shaft 17, mounted in the chamber, carries a series of impeller agitating blades 18 and plates 19. Each plate 19 is located below and adjacent to an annular ring 22 secured to the wall of the chamber 15. A discharge pipe 20 is preferably located a short distance from the bottom of the chamber 15 leaving a shallow receptacle in the bottom of the chamber and this receptacle is provided with an outlet 21.

The operation of the apparatus is as follows. A concentrated solution of a foam-forming agent, such as saponin, is maintained in the container 1 and its flow to the water tank 3 is closely regulated by means of the needle valve. The addition of foam-forming agent is regulated in accordance with the desired stability of the film which forms the bubble and this varies with changes in temperature. The flow of concentrated saponin solution varies with changes in the amount of water being consumed. Moreover, the concentration of the solution may vary on standing and the flow must be regulated accordingly. It is important to maintain a constant percentage of foam-forming agent in the water in order to secure uniformity in the foam produced. The flow of water to and from the tank 3 is under the automatic control of the float valve and the concentrated foaming agent solution is mixed with the water as it is admitted to the tank. A constant water level is maintained in the vessel 6, the level being such as to completely surround the collapsible bags 13.

Air under constant pressure is admitted to the chamber 9 and fills the collapsible bags 13 which then rise to an upright position as illustrated. The bags are uniformly punctured, in any suitable way, to provide exits for fine streams of air which enter the water, forming bubbles which rise in the chamber 6. These collapsible bags act as automatic closing valves for the air supply. Should the air be shut off in closing down, or for other purposes, the bags collapse, closing the punctures to such an extent that water does not enter the bags and flow back into the air chamber and supply apparatus to cause difficulty in restarting operation of the apparatus. The air is under a constant pressure at all points in the bags. A uniform flow of air is thus provided.

The coarse foam thus formed flows into the agitating chamber 15 and the bubbles are there progressively and uniformly sliced or subdivided to provide a foam of any desired density. As the bubbles are subdivided the foam becomes heavier and the impeller blades force it downwardly until it is discharged in the desired form through the pipe 20. The annular rings 22 and plates 19 cause the descending foam to follow a circuitous path so that it is forced into repeated contact with the agitating or slicing blades 18. The effect of centrifugal force caused by the blades is thus overcome and the bubbles must all be subdivided to the desired extent.

Air escaping from subdivided bubbles escapes through the vent 16 located at a point above the foam inlet.

The foam so produced may be used for any desired purpose and obviously its density may be regulated to suit any particular use.

It will be apparent that the apparatus is easily controlled in operation. The output of the apparatus is dependent upon the amount of coarse bubbles produced, while this is governed by the number and/or capacity of the collapsible bags used and the air pressure employed. There is no back pressure in the chamber 6 except that caused by the coarse foam, which is negligible and constant in continuous operation.

I claim:

1. A foam making apparatus comprising a chamber provided with a quantity of a bubble-forming fluid, means for producing a rising column of relatively coarse bubbles on said fluid, an agitating chamber, means for positively directing said bubbles downwardly through said agitating chamber, said agitating chamber having annular rings secured to its inner walls and rotatable plates cooperating therewith to direct the flow of said bubbles in a circuitous path through the chamber and to subdivide said bubbles.

2. A foam making apparatus comprising a chamber provided with a quantity of a bubble-forming fluid of substantially constant height, means for producing a rising column of relatively coarse bubbles on said fluid, an agitating chamber, means for directing said bubbles downwardly into said agitating chamber, said agitating chamber having a series of annular rings secured to its inner wall, a plate mounted on a rotatable shaft located below and adjacent each ring, and agitating blades adapted to progressively subdivide said bubbles and produce an increasingly dense and stable foam.

3. An apparatus as defined in claim 2, wherein said agitating chamber has an air vent at the top, a water outlet at the bottom and a discharge pipe for dense foam, said agitating blades being adapted to impel the foam downwardly.

4. A foam making apparatus comprising a chamber provided with a quantity of bubble-forming fluid of substantially constant height, means for producing a rising column of relatively coarse bubbles on said fluid, an agitating chamber, a series of bubble-subdividing devices in said agitating chamber, each comprising narrowly spaced, relatively rotatable members, impeller blades above each of said subdividing devices for forcibly directing said bubbles downwardly therethrough, and impeller blades below the bottom subdividing device for forcibly expelling the dense foam from said agitating chamber.

In testimony whereof I have affixed my signature.

GEORGE MILLER THOMSON.